(12) United States Patent
Geng et al.

(10) Patent No.: US 12,279,069 B2
(45) Date of Patent: Apr. 15, 2025

(54) VIDEO PROCESSOR, VIDEO PROCESSING METHOD, DISPLAY CONTROL SYSTEM, AND ELECTRONIC DEVICE

(71) Applicant: BOE Technology Group Co., Ltd., Beijing (CN)

(72) Inventors: Lihua Geng, Beijing (CN); Congrui Wu, Beijing (CN); Xitong Ma, Beijing (CN); Ran Duan, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 138 days.

(21) Appl. No.: 18/266,579

(22) PCT Filed: Dec. 21, 2020

(86) PCT No.: PCT/CN2020/138063
§ 371 (c)(1),
(2) Date: Jun. 9, 2023

(87) PCT Pub. No.: WO2022/133663
PCT Pub. Date: Jun. 30, 2022

(65) Prior Publication Data
US 2024/0106977 A1 Mar. 28, 2024

(51) Int. Cl.
*H04N 7/01* (2006.01)
*H04N 5/265* (2006.01)
(Continued)

(52) U.S. Cl.
CPC ............ *H04N 7/0125* (2013.01); *H04N 5/265* (2013.01); *H04N 7/0127* (2013.01); *H04N 21/4302* (2013.01); *H04N 21/4331* (2013.01)

(58) Field of Classification Search
CPC .................................................. H04N 7/0125
See application file for complete search history.

(56) References Cited

U.S. PATENT DOCUMENTS

2013/0021524 A1* 1/2013 Tang ...................... G09G 5/006
348/E7.04

FOREIGN PATENT DOCUMENTS

| CN | 202093501 U | 12/2011 |
| CN | 211184115 U | 8/2020 |
| WO | 2009126686 A1 | 10/2009 |

OTHER PUBLICATIONS

Wu Yikai. "Design and Implementation of Video Scaling Based on FPGA." A dissertation for doctor''s degree. Jiangsu University. 2017.

(Continued)

*Primary Examiner* — Michael H Hong
(74) *Attorney, Agent, or Firm* — IPro, PLLC

(57) ABSTRACT

Provided is a video processor. The video processor includes: a receiving module, configured to receive source video display data and parse the source video display data as valid video display data; a pre-processing module, configured to generate valid video display data in a predetermined video format; an image quality processing module, configured to adjust image quality parameters to output a first video screen; a post-processing module, configured to extract video parameters, generate a blended screen, and blend the blended screen on the first video screen; and a video output module, configured to perform data format conversion on valid video display data of the first video screen and valid video display data of the blended screen to encapsulate as output video display data, and output the output video display data to an external display to blend the blended screen on the first video screen.

20 Claims, 5 Drawing Sheets

(51) Int. Cl.
*H04N 21/43* (2011.01)
*H04N 21/433* (2011.01)

(56) References Cited

OTHER PUBLICATIONS

PCT/CN2020/138063 international search report.

* cited by examiner

VIDEO PROCESSOR, VIDEO PROCESSING METHOD, DISPLAY CONTROL SYSTEM, AND ELECTRONIC DEVICE

CROSS-REFERENCE TO RELATED APPLICATIONS

This application is a U.S. national stage of international application No. PCT/CN2020/138063, filed on Dec. 21, 2020, the disclosure of which is incorporated herein by reference in its entirety.

TECHNICAL FIELD

The present disclosure relates to the field of display control technologies, and in particular, relates to a video processor, a method for processing a video, a display control system, and an electronic device.

BACKGROUND OF THE INVENTION

A 4K definition is an ultra-high definition. With this definition, viewers can clearly view each detail and feature. Currently, in a monitoring system, as requirements for functions and properties of the monitoring system are great, the monitoring system generally is disposed with a display with the 4K definition.

SUMMARY OF THE INVENTION

Some embodiments of the present disclosure provide a video processor. The video processor includes:
a receiving module, configured to receive source video display data adopting different communication protocols over at least one input interface and parse the source video display data adopting the different communication protocols as valid video display data;
a pre-processing module, connected to the receiving module, and configured to generate valid video display data in a predetermined video format by pre-processing a video format of the valid video display data;
an image quality processing module, connected to the pre-processing module, and configured to adjust image quality parameters in the valid video display data in the predetermined video format to output a first video screen;
a post-processing module, connected to the pre-processing module and the image quality processing module, and configured to extract video parameters in the valid video display data, generate a blended screen based on the video parameters, and blend the blended screen on the first video screen; and
a video output module, connected to the post-processing module, and configured to perform data format conversion on valid video display data of the first video screen and valid video display data of the blended screen to encapsulate as output video display data, and output the output video display data to an external display over a video output interface to blend the blended screen on the first video screen for display.

Some embodiments of the present disclosure provide a display control system. The display control system includes the above video processor and a controller configured to control the video processor to process received source video display data and transmit the processed video display data to a display.

Some embodiments of the present disclosure provide a method for processing a video. The method includes:
receiving source video display data adopting different communication protocols over at least one input interface and parsing the source video display data adopting the different communication protocols as valid video display data;
generating valid video display data in a predetermined video format by pre-processing a video format of the valid video display data;
adjusting image quality parameters in the valid video display data in the predetermined video format to output a first video screen;
extracting video parameters in the valid video display data, generating a blended screen based on the video parameters, and blending the blended screen on the first video screen; and
performing data format conversion on valid video display data of the first video screen and valid video display data of the blended screen to encapsulate as output video display data, and outputting the output video display data to an external display over a video output interface to blend the blended screen on the first video screen for display.

Some embodiments of the present disclosure provide a computer-readable storage medium storing one or more video processing programs. The one or more video processing programs, when loaded and run by a processor, cause the processor to perform the above method for processing the video.

Some embodiments of the present disclosure provide an electronic device. The electronic device includes a memory, a processor, and video processing programs stored on the memory and runnable on the processor. The processor, when running the video processing programs, is caused to perform the above method for processing the video.

Additional aspects and advantages of the present disclosure will be partially shown in the following description, be partially obvious based on the following description, or be acknowledged based on practices of the present disclosure.

DETAILED DESCRIPTION OF THE INVENTION

The embodiments of the present disclosure are described hereinafter in detail, and examples of the embodiments are illustrated in the accompanying drawings. Throughout the accompanying drawings, the same or similar reference signs represent the same or similar components or components with the same or similar functions. The embodiments described below with reference to the accompanying drawings are exemplary, and are only intended to explain the present disclosure, rather than to limit the present disclosure.

A conventional monitoring system generally uses a decentralized system to perform data processing on 4K input data, connection relationships between sub-systems are complex, and data interaction is great, such that the system is not stable.

The following describes the video processor, the display control system, the method for processing the video, the computer-readable storage medium, and the electronic device in the embodiments of the present disclosure with reference to the accompanying drawings.

Figure 1:
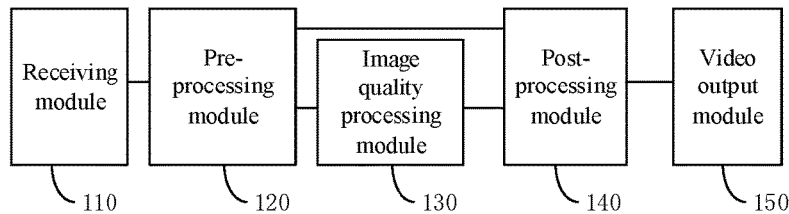
FIG. 1 is a schematic structural diagram of a video processor according to some embodiments of the present disclosure.

As shown in FIG. 1, in the present disclosure, the video processor includes a receiving module 110, a pre-processing module 120, an image quality processing module 130, a post-processing module 140, and a video output module 150. The receiving module 110 is configured to receive source video display data adopting different communication protocols over at least one input interface and parse the source video display data adopting the different communication protocols as valid video display data. The pre-processing module 120 is connected to the receiving module 110, and is configured to generate valid video display data in a predetermined video format by pre-processing a video format of the valid video display data. The image quality processing module 130 is connected to the pre-processing module 120, and is configured to adjust image quality parameters in the valid video display data in the predetermined video format to output a first video screen. The post-processing module 140 is connected to the pre-processing module 120 and the image quality processing module 130, and is configured to extract video parameters in the valid video display data, generate a blended screen based on the video parameters, and blend the blended screen on the first video screen. The video output module 150 is connected to the post-processing module 140, and is configured to perform data format conversion on valid video display data of the first video screen and valid video display data of the blended screen to encapsulate as output video display data, and output the output video display data to an external display over a video output interface to blend the blended screen on the first video screen for display.

Specifically, in the present disclosure, the video processor is a field programmable gate array (FPGA). The FPGA has a great degree of parallelism, and a plurality of modules in the FPGA can compute simultaneously and independently with a great processing speed, and can allocate inner resources based on requirements to complete different logical functions. The video processor is configured to process received video signals and output to a subsequent 4K display. The 4K display is an ultra-high definition display with a pixel definition of 4096*2160, and can be used to monitor the system or other display scenarios with a great requirement for a precision of a display screen.

The video processor includes a plurality of input interfaces configured to receive the source video display data adopting the different communication protocols. The receiving module 110 includes a plurality of receiving units, and each receiving unit is connected to the input interface of a same type, and is configured to parse the source video display data adopting the different communication protocols as valid video display data that can be processed by the video processor. It should be noted that data formats of the valid video display data parsed based on the source video display data received over different input interfaces are the same, and detailed display content can be different. The pre-processing module 120 is configured to receive the valid video display data and process the video format of the valid video display data to convert to valid video display data in the predetermined video format, such that the valid video display data in the predetermined video format fits the subsequent display. The video format includes a definition, a scan mode, a frame rate, a color format, a color depth, and the like. After the pre-processing module 120 converts the video format of the valid video display data to the predetermined video format, the image quality processing module 130 adjust the image quality parameters in the valid video display data in the predetermined video format to output the first video screen. The image quality parameters include hue, chromaticity, contrast, brightness, color temperature, gamut, a gamma correction parameter, and a color space conversion parameter. The post-processing module 140 is configured to read the valid video display data from the pre-processing module 120, extract the video parameters in the valid video display data, and generate the blended screen based on the video parameters. The video output module 150 perform the data format conversion on the valid video display data of the first video screen and the valid video display data of the blended screen to encapsulate as the output video display data, such that the external display processes the output video display data, and then the blended screen is blended on the first video screen for display.

The video processor in the above embodiments includes the receiving module, the pre-processing module, the image quality processing module, the post-processing module, and the video output module, such that multiple functions, such as video receiving, video pre-processing, video image quality processing, video post-processing, video outputting, and the like are integrated in a system. Compared with a decentralized system, connection and data interaction between processing cores in the integrated video processor are reduced, the system stability is improved, and an effect on the system caused by an electromagnetic compatibility problem and power consumption is reduced. In addition, the video processor further includes at least one input interface that can receive the source video display data adopting the different communication protocols, process the source video display data adopting the different communication protocols to output to the external display for display, such that compatibility of the video processor is improved.

Figure 2:
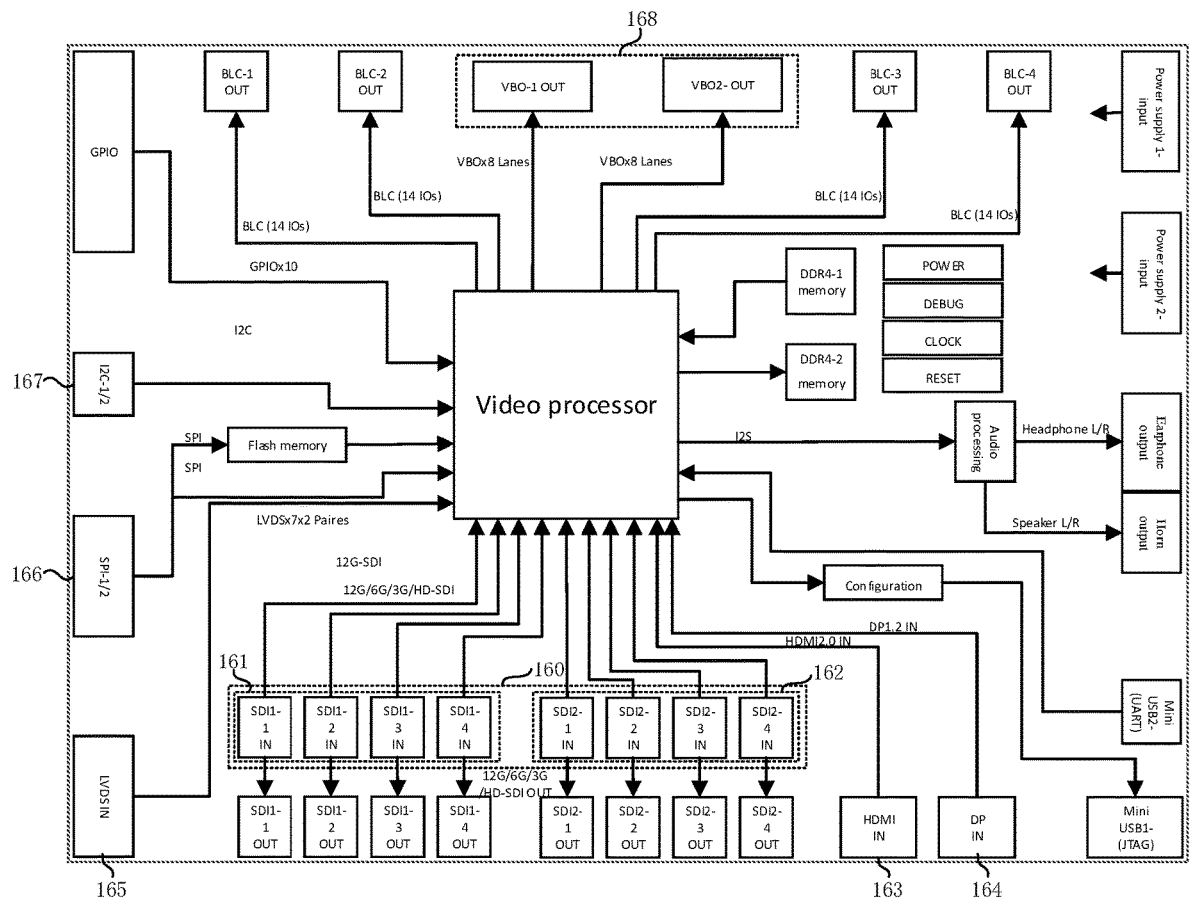
FIG. 2 is a schematic structural diagram of hardware interfaces of a video processor according to some embodiments of the present disclosure.

In some embodiments, as shown in FIG. 2, the input interface of the video processor includes a first input interface module 160, a second input interface 162, a third input interface 163, and a fourth input interface 164. The first input interface module 160 is configured to receive source video display data adopting an 12G-serial digital interface (SDI) communication protocol, a 6G-SDI communication protocol, a 3G-SDI communication protocol, or a high definition-serial digital interface (HD-SDI) communication protocol. The second input interface 163 is configured to receive source video display data adopting a high definition multimedia interface (HDMI) 2.0 communication protocol. The third input interface 164 is configured to receive source video display data adopting a display port (DP) 1.2 communication protocol. The fourth input interface 165 is configured to receive source video display data of an on-screen display (OSD) menu screen.

The first input interface module 160 includes at least one set of SDI input interfaces, and the embodiments are illustrated by taking the first input interface module includes two sets of SDI input interfaces as an example. As shown in FIG. 2, the first input interface module 160 includes a first set of SDI input interfaces 161 (SDI1 shown in FIG. 2) and a second set of SDI input interfaces 162 (SDI2 shown in FIG. 2), and each set of SDI input interfaces includes four SDI input interfaces. In the embodiments, the SDI input interface is the 12G-SDI input interface that supports input of a video signal of a definition of 8K and a frame rate of 60 fps at most. In addition, the 12G-SDI input interface is compatible with the 12G-SDI communication protocol, the 6G-SDI communication protocol, the 3G-SDI communication protocol, and the HD-SDI communication protocol. The SDI input interface directly transmits the high speed signal to the video processor upon passing through a SDI signal equalizer, and the receiving module of the video processor receives the high speed signal. The video processor in the embodiments further includes two sets of SDI output interfaces, and each set of SDI output interfaces includes four SDI output interfaces. The two sets of SDI output interfaces are in one-to-one correspondence with the two sets of SDI input interfaces, and the SDI output interface is a physical output of the SDI input interface.

The second input interface 163 is a HDMI input interface which supports input of an audio and video adopting the HDMI 2.0 communication protocol. The third input interface 164 is a DP input interface which supports input of an audio and video adopting the DP 1.2 communication protocol. The fourth input interface 165 is a LVDS input interface which supports input of a video of a definition of 2K and a frame rate of 60 fps at most. An external controller transmits the OSD menu screen to the video processor over the LVDS input interface. In the above input interfaces, the SDI input interface, the HDMI input interface, and the DP input interface are configured to receive audio data and video data input by external video sources, and the LVDS input interface is configured to receive video data of the OSD menu input by the external controller.

Furthermore, the input interface of the video processor further includes an external controller interface, and the external controller interface is connected to the external controller, such that the external controller upgrades a system of the video processor and monitors the video processor over the external controller interface.

The external controller interface includes a serial peripheral interface (SPI) 166 and an inter-integrated circuit (I2C) interface 167, and the SPI 166 and the I2C interface 167 are connected to the external controller. The external controller upgrades the system of the video processor over the SPI interface 166, and monitors the video processor over the I2C interface 167.

The video output interface of the video processor includes two V-BY-ONE (VBO) output interfaces 168 which support output of a video of dual 4K and 60 fps at most and support driving of a liquid crystal display (LCD) of a definition of 4K based on folded screen technique. In addition, the video processor further includes four back light control interfaces: BLC-1 OUT, BLC-2 OUT, BLC-3 OUT, and BLC-4 OUT. The back light control interface controls back light of the external display in a SPI clock control manner or in a pulse width modulation (PWM) manner.

The video processor further includes an earphone output interface and a horn output interface. An audio signal is extracted by the video processor from the SDI input interface, the HDMI input interface, and the DP input interface, and then is transmitted to an audio processing module over an inter-IC sound (I2S) interface. The audio processing module includes a codec and an amplifier that are configured to process the audio signal, and then the audio signal is output over the earphone output interface and the horn output interface. The earphone output interface drives earphones in left and right auditory canals, and the horn output interface drives horns in left and right auditory canals. In addition, the video processor further includes a power supply input interface configured to input an external power supply and a general-purpose input/output port (GPIO) interface configured to control functions by programs.

The above video processor includes the SDI input interface, the HDMI input interface, and the DP input interface, such that the video data adopting different communication protocols is received over the above video input interfaces, the video data adopting different communication protocols is processed to output to the external controller, and thus compatibility of the video processor is improved.

Figure 3:
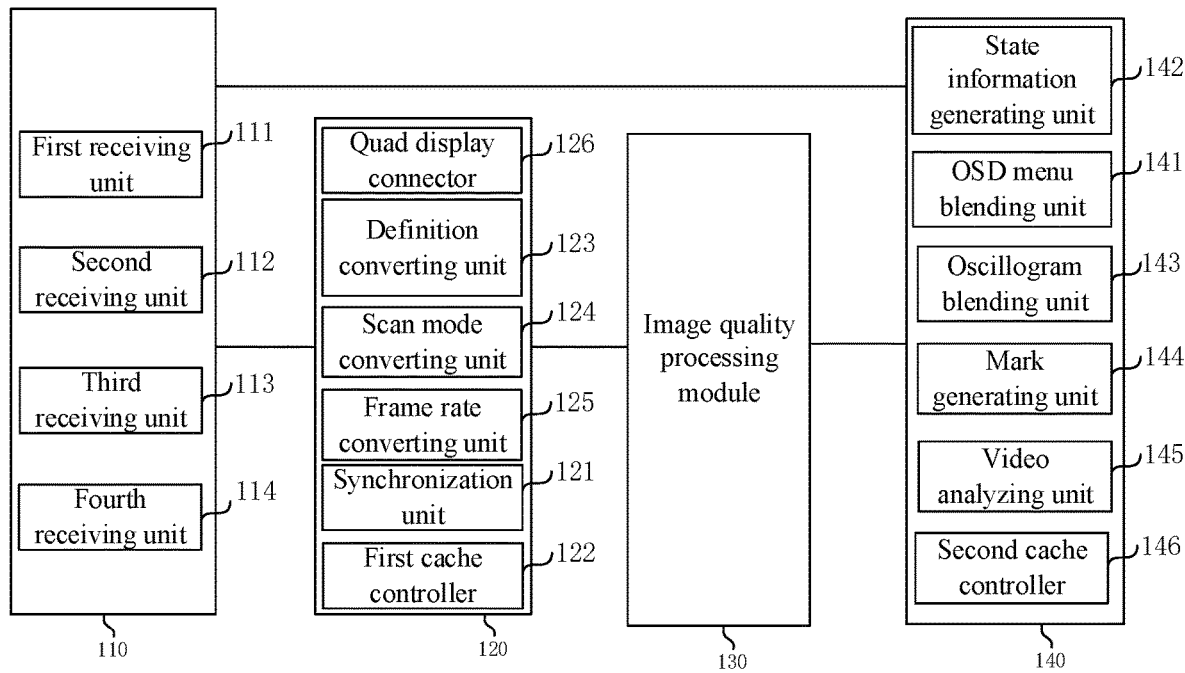
FIG. 3 is a schematic structural diagram of another video processor according to some embodiments of the present disclosure.

In some embodiments, as shown in FIG. 3, the receiving module 110 includes a first receiving unit 111, a second receiving unit 112, a third receiving unit 113, and a fourth receiving unit 114. The first receiving unit 111 is connected to the first input interface module 160, and is configured to parse the source video display data adopting the 12G-SDI communication protocol, the 6G-SDI communication protocol, the 3G-SDI communication protocol, or the HD-SDI communication protocol as first valid video display data. The second receiving unit 112 is connected to the second input interface 163, and is configured to parse the source video display data adopting the HDMI 2.0 communication protocol as second valid video display data. The third receiving unit 113 is connected to the third input interface 164, and is configured to parse the source video display data adopting the DP 1.2 communication protocol as third valid video display data. The fourth receiving unit 114 is connected to the fourth input interface 165, and is configured to parse the source video display data of the OSD menu screen transmitted by the external controller as fourth valid video display data. Data formats of the first valid video display data, the second valid video display data, the third valid video display data, and the fourth valid video display data are the same, such that the subsequent video pre-processing module 120 pre-processes the parsed valid video display data. The above video processor extracts valid video data from the source video display data adopting the different communication protocols by the first receiving unit, the second receiving unit, the third receiving unit, and the fourth receiving unit for being processed by the video processor, such that the compatibility of the data of the video processor is improved.

In some embodiments, as shown in FIG. 3, the video pre-processing module 120 includes a synchronization unit 121 and a first cache controller 122. The synchronization unit 121 is configured to synchronize valid video display data from the different input interfaces by storing the valid video display data from different input interfaces to an external cache for the first cache controller 122 to read the valid video display data from the different input interfaces from the external cache based on a synchronization clock.

The synchronization unit 121 synchronously processes videos received over different input interfaces. The manner of synchronously processing is to store the valid video display data input from the different input interfaces to the external cache and read from the external cache based on synchronization clock and timing sequence. The external cache is a double-data-rate fourth generation-synchronous dynamic random access memory (DDR4-SDRAM) cache.

In some embodiments, the pre-processing module 120 further includes a definition converting unit 123. The definition converting unit 123 is configured to perform definition conversion on the synchronized valid video display data, such that a definition of the synchronized valid video display data reaches a target definition.

Furthermore, the definition converting unit 123 performs the definition conversion on the synchronized valid video display data in a definition multiplication conversion manner. Pixel supplementation is performed in a case that a definition of the multiplication converted valid video display data is less than the target definition, such that a definition of a display screen reaches the target definition.

In the present disclosure, the external display connected to the video processor is a 4K ultra-high definition display. Generally, a definition of the 4K ultra-high definition display is 4096*2160. Thus, to adapt a definition of the external display, the definition converting unit 123 converts the definition of the received valid video display data to 4096*2160. The definition converting unit 123 detects the definition of the received valid video display data, determines an up-zoom conversion or a down-zoom conversion based on the definition of the received valid video display data and the definition of the external display, determines a conversion coefficient, and converts the valid video display data based on the conversion coefficient, such that the converted definition of the valid video display data reaches the target definition, that is, 4096*2160.

Figure 4:
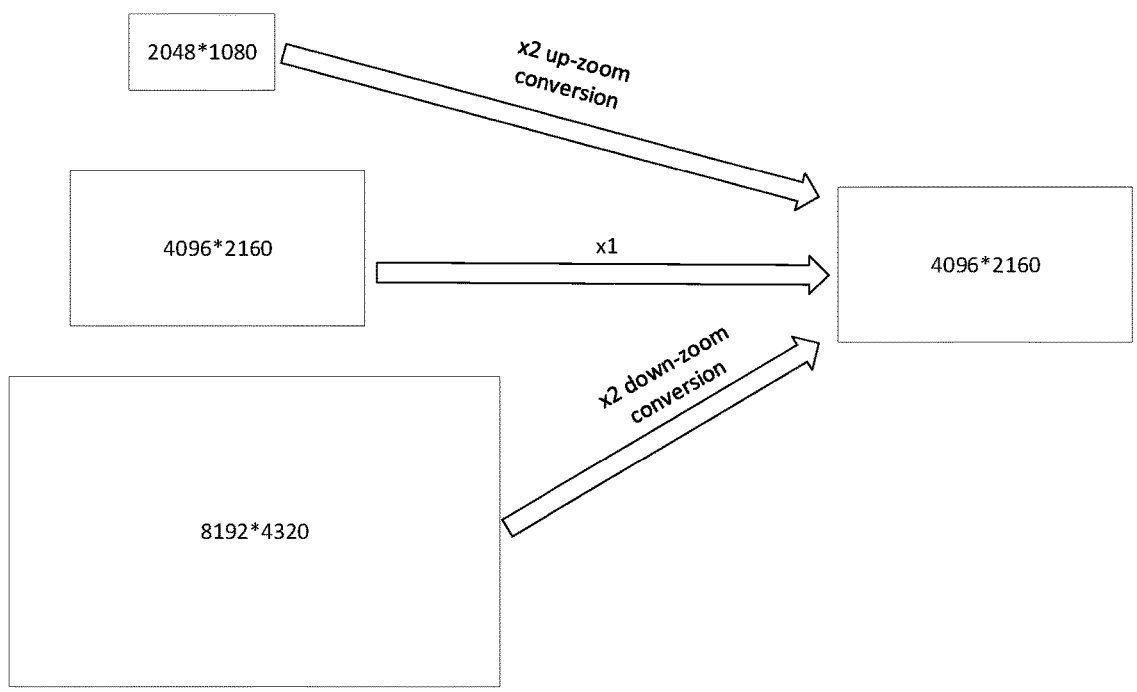
FIG. 4 is a schematic diagram of a definition converting manner according to some embodiments of the present disclosure.

As shown in FIG. 4, in the case that the definition converting unit 123 detects that the definition of the input valid video display data is 2048*1080, the definition of the input valid video display data is converted to 4096*2160 by the up-zoom conversion with a coefficient of 2. In the case that the definition converting unit 123 detects that the definition of the input valid video display data is 8192*4320, the definition of the input valid video display data is converted to 4096*2160 by the down-zoom conversion with a coefficient of 2. In the case that the definition converting unit 123 detects that the definition of the input valid video display data is 4096*2160, the definition of the input valid video display data is kept unchanged.

Figure 5:
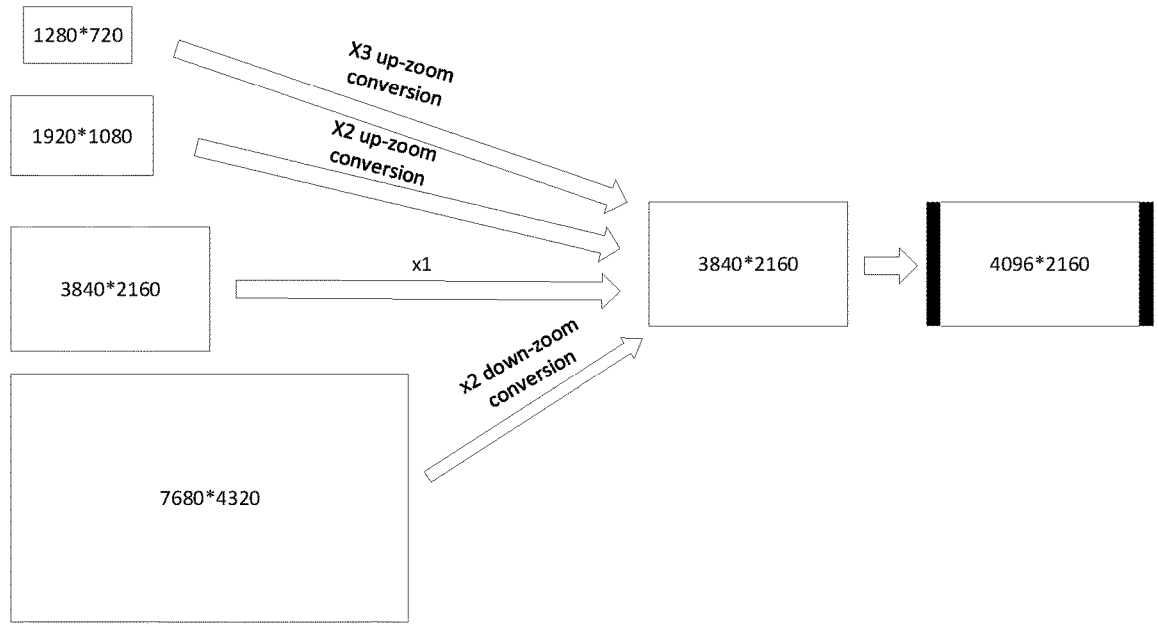
FIG. 5 is a schematic diagram of another definition converting manner according to some embodiments of the present disclosure.

As shown in FIG. 5, in the case that the input valid video display data is valid video display data with horizontal pixels:vertical pixels being 16:9, the definition converting unit 123 converts the definition of the valid video display data to 3840*2160, and respectively supplements 128 columns of pixels of single color on two sides of a video image, such that a number of pixels in horizontal display is 4096, and thus the definition is converted to 4096*2160. The supplemented pixels of single color are black pixels or white pixels. For example, in the case that the definition of the input valid video display data is 1280*720 or 1920*1080, the definition of the input valid video display data is converted to 3840*2160 by the up-zoom conversion with the coefficients of 3 and 2. In the case that the definition of the input valid video display data is 7680*4320, the definition is converted to 3840*2160 by the down-zoom conversion with the coefficient 2. In the case that the definition of the input valid video display data is 3840*2160, the definition of the input valid video display data is kept unchanged. Then, 128 columns of black pixels are supplemented on two sides of the video image, such that the definition reaches 4096*2160. The 4K definition has other various derived definitions, for example, 4096*3112, 3056*2664, 3840*2160, and the like. In the embodiments, the definition of the valid video display data may be converted to the above derived 4K definitions in the above definition converting manner. The video processor in the above embodiments can receive video sources with various definitions and convert the various definitions to the target definition, such that the compatibility is great.

In some embodiments, the pre-processing module 120 further includes a scan mode converting unit 124. The scan mode converting unit 124 is configured to determine an input scan mode of the valid video display data, and uniformly convert the scan mode of the valid video display data to a progressive scan based on a result of the determination.

In some embodiments, in the case that the scan mode of the valid video display data is an interlaced scan, the scan mode converting unit 124 intersperse and combine valid video display data corresponding to odd rows of an odd frame and valid video display data corresponding to even rows of an adjacent even frame, such that the interlaced scan is converted to the progressive scan.

Figure 6:
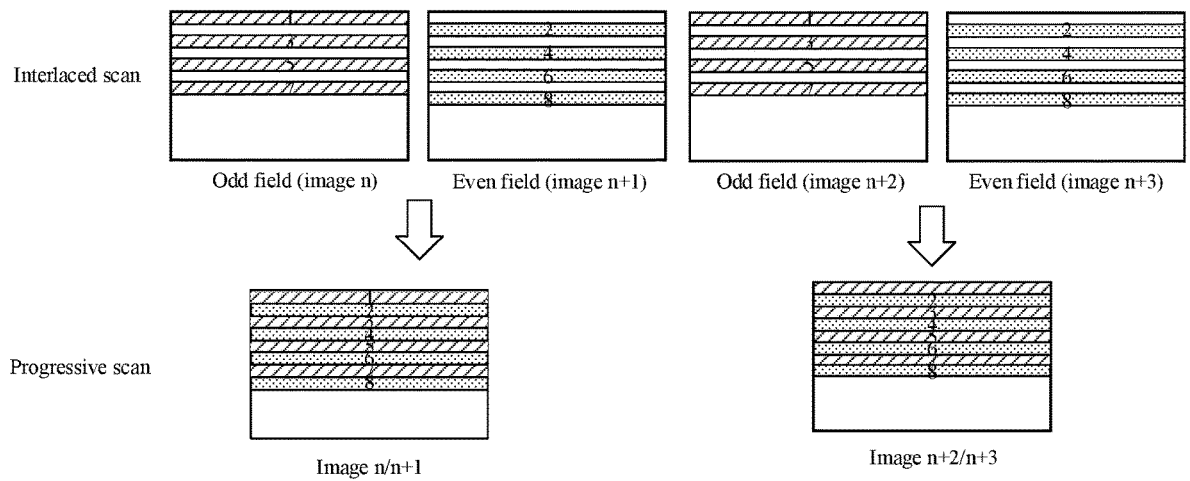
FIG. 6 is a schematic diagram of a manner of converting scan modes according to some embodiments of the present disclosure.

As shown in FIG. 6, in the case that the scan mode of the valid video display data is the interlaced scan, and an image n is an image of an odd frame, display data corresponding to odd rows is scanned and display data corresponding to even rows is not scanned in scanning the image n; display data corresponding to even rows is scanned and display data corresponding to odd rows is not scanned in scanning the image n+1, and an image n+2, an image n+3, and images of the following frames are in the similar scan mode. In the case that the interlaced scan is converted to the progressive scan, the display data of the even rows of the image n+1 is copied to the even rows of the image n, and the display data of the odd rows of the image n is copied to the odd rows of the image n+1. As such, the display date of adjacent odd frame and even frame are alternately combined, such that the image n and the image n+1 form a frame of complete image, and display content of the image n and display content of the image n+1 are the same. In scanning the image n and the image n+1, display date corresponding to odd rows and even rows of the combined image are progressively scanned.

In some embodiments, in the case that the scan mode of the valid video display data is an interlaced scan, the valid video display data corresponding to the odd rows of the odd frame is kept unchanged, black pixels are supplemented in even rows of the odd frame, the valid video display data corresponding to the even rows of the adjacent even frame is kept unchanged, and black pixels are supplemented in odd rows of the even frame, such that the interlaced scan is converted to the progressive scan.

Figure 7:
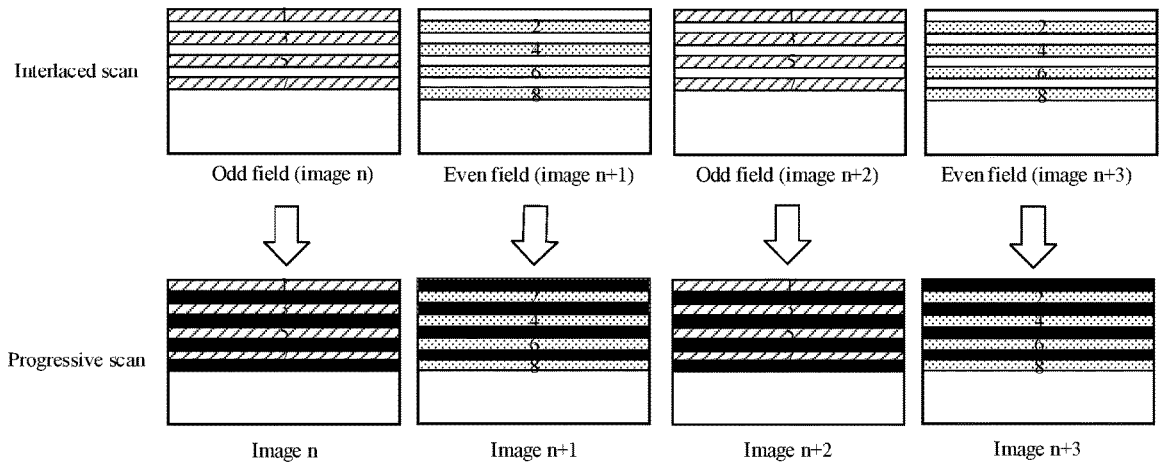
FIG. 7 is a schematic diagram of another manner of converting scan modes according to some embodiments of the present disclosure.

As shown in FIG. 7, assuming that an image n is an image of an odd frame, in the process of interlaced scan, display data corresponding to odd rows is scanned and display data corresponding to even rows is not scanned in scanning the image n; display data corresponding to even rows is scanned and display data corresponding to odd rows is not scanned in scanning the image n+1, and an image n+2, an image n+3, and images of the following frames are in the similar scan mode. In the case that the interlaced scan is converted to the progressive scan, the display data corresponding to the odd rows of the image n is kept unchanged, black pixels are supplemented in the even rows of the image n, the odd rows and the even rows are progressively scanned, the odd rows are display normally, and the even rows are in black. In scanning the image n+1, the display data corresponding to the even rows is kept unchanged, black pixels are supplemented in the odd rows of the image n+1, the odd rows and the even rows are progressively scanned, the even rows are display normally, and the odd rows are in black.

In some embodiments, in the case that the scan mode of the valid video display data is a progressive segmented scan, valid video display data corresponding to odd rows of an odd frame and valid video display data corresponding to even rows of an adjacent even frame are interspersed and combined, such that the progressive segmented scan is converted to the progressive scan.

Figure 8:
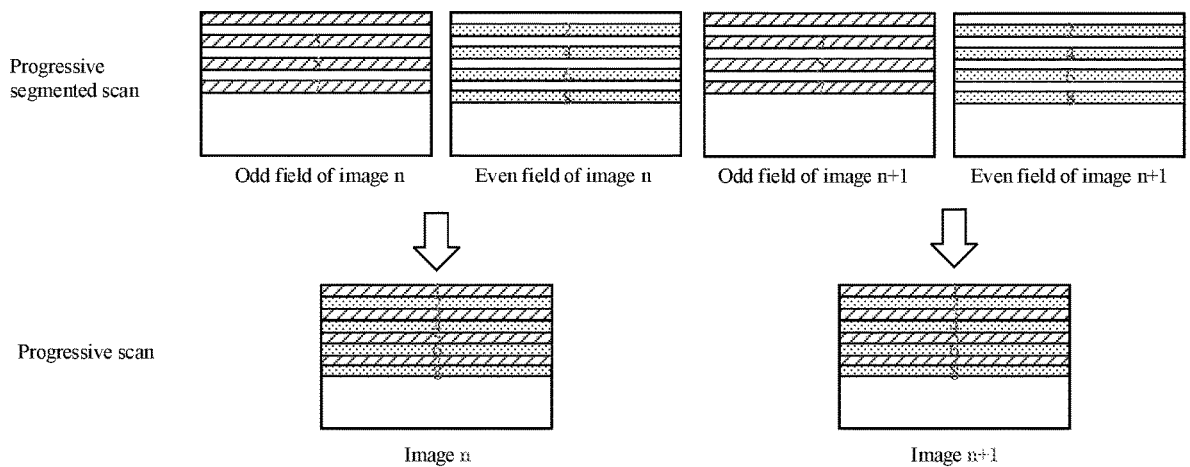
FIG. 8 is a schematic diagram of another manner of converting scan modes according to some embodiments of the present disclosure.

As shown in FIG. 8, in the process of progressive segmented scan, the image n is divided to an odd field and an even field. The odd field includes display data of odd rows of the image n, and the even field includes display data of even rows of the image n. In the scanning process, the odd rows of the odd field of the image n are first progressively scanned, and then the even rows of the even field of the image n are progressively scanned, such that the scan of the image n is completed.

In the case that the progressive segmented scan is converted to the progressive scan, the odd rows of the image n and the even rows of the image n are interspersed and combined. That is, the display date of the even rows of the even field of the image n is interspersed in the odd rows of the odd field. In the scanning process, the display data of the odd rows and the display data of the even rows are progressively scanned.

The above video processor can convert various scan modes to the progressive scan, such that the output display screen is clear without flickers, dynamic anamorphose is less, and the display effect is improved.

In some embodiments, the pre-processing module 120 further includes a frame rate converting unit 125. The frame rate converting unit 125 is configured to uniformly copy frame rates of the valid video display data in integer multiplication to uniformly convert to a target frame rate.

A manner of unifying the frame rate is to convert the frame rate in integer multiplication with a uniform copy of the frame rate manner, such that a case of non-uniform frame caused by frame rate conversion is avoided, and a case of a lag in video playback is further avoided. A corresponding relationship of the frame rate conversion is shown in the following table.

| Input frame rate (fps) | Conversion manner | Uniform frame rate (fps) |
|---|---|---|
| 24 | Uniform copy of frames in 2 times | 48 |
| 24/1.001 | Uniform copy of frames in 2 times | 48/1.001 |
| 25 | Uniform copy of frames in 2 times | 50 |
| 30 | Uniform copy of frames in 2 times | 60 |
| 30/1.001 | Uniform copy of frames in 2 times | 60/1.001 |
| 50 | Unchanged | 50 |
| 60 | Unchanged | 60 |
| 60/1.001 | Unchanged | 60/1.001 |

The frame rate is eventually uniformed as 48 (48/1.001) fps, 50 fps, and 60 (60/1.001) fps, and the frame rate is not converted in the subsequent processes. As the frame rate is converted in integer multiplication with a uniform copy of the frame manner, a case of the lag of playback screen caused by non-uniform frame may not exist. In addition, in the case that the frame rate is improved to 48 (48/1.001) fps, 50 fps, and 60 (60/1.001) fps, the output video is smoother and clearer. It should be noted that the subsequent display supports an input range of the frame rate of 45 fps to 75 fps to receive and display videos of multiple frame rates.

In addition, the pre-processing module 120 further uniforms a color format and a pixel bit depth of the input valid video display data. The color format is uniformed as YCbCr444 or RGB. In the case that the color format of the input valid video display data is YCbCr422 or YCbCr420, the color format is converted to YCbCr444. In the case that the color format of the input valid video display data is YCbCr444 or RGB, the color format is kept unchanged. The pixel bit depth is uniformed as 12 bits. In the case that pixel bit depth of the input valid video display data is 8 bits or 10 bits, 0 is added in a low bit to convert to 12 bits. In the case that pixel bit depth of the input valid video display data is 12 bits, the pixel bit depth is kept unchanged. In the case that pixel bit depth of the input valid video display data is 14 bits or 16 bits, the low bit is deleted to convert to 12 bits.

The above video processor uniforms different definitions, scan modes, frame rates, color formats, and pixel bit depths of the input video as the uniform video format to meet the display requirements of the subsequent 4K display, such that the display effect is improved.

In some embodiments, the first receiving unit 111 includes at least one receiving sub-unit connected to at least one set of SDI input interfaces. Each receiving sub-unit is configured to convert four different channels of source video display data to four different channels of valid video display data. The pre-processing module 120 further includes a quad display connector 126. The quad display connector is connected to the receiving sub-unit, and is configured to convert the four different channels of valid video display data received by the receiving sub-unit to valid video display data in a predetermined video format, and perform image pasting on four channels of valid video display data in the predetermined video format based on a predetermined rule.

Figure 9:
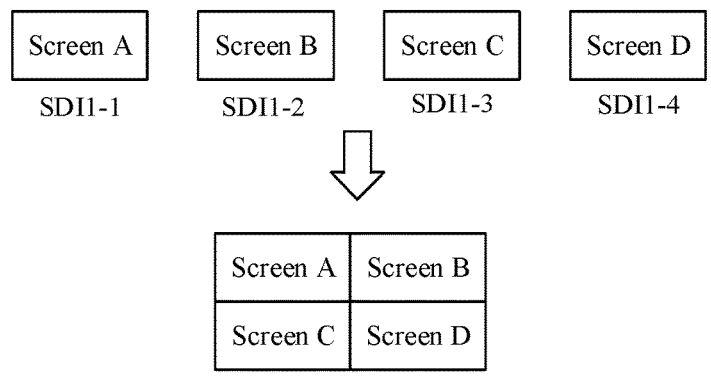
FIG. 9 is a schematic diagram of a quad displaying manner according to some embodiments of the present disclosure.

The embodiments are illustrated by taking the quad display connector 126 being connected to one of the receiving units as an example. The receiving sub-unit is connected to four SDI input interfaces, and is configured to receive four different channels of source video display data and convert the four different channels of source video display data to the valid video display data. The four channels of valid video display data have uniform definition, frame rate, scan mode, frame rate, color format, and pixel bit depth upon the above uniform conversion of the video format. In the embodiments, display screens corresponding to the four channels of valid video display data are combined in a shape of "⊕." That is, the display is divided into two equal parts of an upper display portion and a lower display portion, then the display is further divided into two equal parts of a left display portion and a right display portion, and a display definition of each portion is 2048*1080. The formats of the display screen corresponding to the four channels of valid video display data are uniformed as that: the definitions are uniformed as 2048*1080; the frame rates are uniformed as 60 fps, the frame rate may be non-uniform frame copy, for example, in the case that the frame rate of the source display data is 24 fps or 25 fps, the frame rate is converted to 60 fps in non-uniform frame copy manner; the image scan mode is uniformed as the progressive scan; the color formats are uniformed as YCbCr; the pixel bit depths are uniformed as 12 bits. Afterwards, as shown in FIG. 9, four screens are combined in the shape of "s," a definition of the combined video screen is 4096*2160, a frame rate is 60 fps, the scan mode is the progressive scan, the color format is YCbCr, and the pixel bit depth is 12 bits. A quad display screen input by four SDI input interfaces is eventually displayed on the display screen. The above video processor outputs and displays four different channels of video screens on the same display by the quad display connector, which facilitates viewing and comparing in the case that the video processor is applied to the monitoring system.

The image quality processing module 130 is configured to adjust and optimize video parameters of the input video, and adjustable video parameters include hue, chromaticity, contrast, brightness, color temperature, a gamma correction parameter, gamut, a color space conversion parameter, and the like. In the gamut adjustment function, a 1D look up table (LUT) color matrix and 3D LUT engine are used to adjust.

In some embodiments, the post-processing module 140 includes an OSD menu blending unit 141, a state information generating unit 142, an oscillogram blending unit 143, and a mark generating unit 144.

The OSD menu blending unit 141 is configured to generate an OSD menu based on OSD menu parameters and blend the OSD menu on the first video screen output by the image quality processing module 130. The state information generating unit 142 is configured to extract the video format of the valid video display data and generate a blanking screen based on the video format of the valid video display data, such that the blanking screen is blended on the first video screen experiencing image quality processing. The oscillogram blending unit 143 is configured to acquire oscillogram information of the valid video display data, draw an oscillogram based on the oscillogram information, such that the oscillogram is blended on the first video screen. The mark generating unit 144 is configured to receive mark information and generate a mark graph based on the mark information, such that the mark graph is blended on the first video screen.

The OSD menu blending unit 141 is connected to the fourth receiving unit, and is configured to generate an OSD menu image based on OSD menu parameters input by the fourth receiving unit and blend the OSD menu image on the first video screen experiencing image quality processing. A blending position and transparence are adjustable.

The state information generating unit 142 is configured to identify state information of the video input by the video interface. The state information is a video format of the input video, and the video format includes the definition, the frame rate, the color space, the bit depth, the scan mode, and the like. The above state information is converted to texts, and is displayed on the first video screen blended with the OSD menu image in the text manner. Specifically, the texts are displayed in a right upper corner, a left upper corner, and other positions of the first video screen, as long as not blended with the OSD menu image. The display of the state information has a blanking time, and the state information automatically blanks upon display for n seconds. In the case that the format of the source video display data input by the input interface changes, the state information generating unit 142 identifies the video format based on the re-input source video display data, and displays the state information again. The state information further blanks when reaches the blanking time. In addition, in the case that no video is input over the input interface or the video format is not supported, the state information is not blanked, and no signal is displayed or supported.

The oscillogram blending unit 143 is configured to acquire oscillogram information, acquire the oscillogram by imaging the oscillogram information, and blend the oscillogram on the first video screen for display. Furthermore, the post-processing module further includes a video analyzing unit 145 connected to the oscillogram blending unit 133. The video analyzing unit 145 is configured to read the valid video display data from the pre-processing module 120, extract oscillogram information from the valid video display data, and transmit the oscillogram information to the oscillogram blending unit 133. The oscillogram blending unit 133 generates an oscillogram by imaging the oscillogram information, and blends the oscillogram on the first video screen for viewing and analysis of the user. The oscillogram information may be a chromaticity oscillogram, a brightness oscillogram, and the like.

The mark generating unit 144 is configured to acquire mark information input by the user, and generate a mark graph by imaging the mark information, such that the mark graph is blended on the first video screen. The mark information may be a safety block, a central point, and the like.

The post-processing module 140 further includes a second cache controller 146. The second cache controller 146 is configured to read and write the external cache in the case that the post-processing module requires to cache the data.

In some embodiments, the video processor further includes an audio transmitting module and an audio processing module (not shown in the drawing). The audio transmitting module is configured to receive audio data over the input interface, parse the audio data as valid audio data in a predetermined data format, and transmit to the audio processing module, such that the audio processing module processes the valid audio data and outputs to an external playing module.

Specifically, the audio transmitting module extracts the audio signal over the SDI input interface, the HDMI input interface, and the DP input, and transmits to the audio processing module over the I2S interface. The audio processing module includes a codec and an amplifier that are configured to process the audio signal, and then the audio signal is output over the earphone output interface and the horn output interface.

According to the above video processor, multiple functions, such as video receiving, video pre-processing, video image quality processing, video post-processing, video outputting, and the like are integrated in a system. Compared with a decentralized system, connection relationships between processing modules in the integrated video processor are more simple, the data interaction between the processing modules is reduced, the system stability is improved, and an effect on the system caused by an electromagnetic compatibility problem and power consumption is reduced. In addition, the video processor further includes at least one input interface that can receive the source video display data adopting the different communication protocols, process the source video display data adopting the different communication protocols to output to the external display for display, such that compatibility of the video processor is improved.

Figure 10:
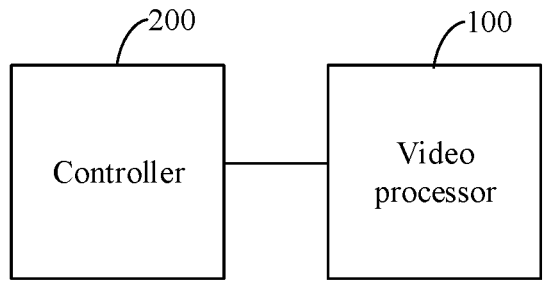
FIG. 10 is a schematic structural diagram of a display system according to some embodiments of the present disclosure.

As shown in FIG. 10, some embodiments of the present disclosure further provide a display control system. The display control system includes the above video processor 100. The display control system further includes a controller 200 configured to control the video processor 100 to process received source video display data and transmit the processed video display data to a display.

In some embodiments, the controller 200 may be a system on chip (SOC). The controller 200 controls and schedules operations of a processing system of the video processor 100 over the I2C input interface of the video processor, and updates and upgrades procedures of the video processor 100 over the SPI input interface. The controller 200 transmits the drawn OSD menu to the video processor 100 over the LVDS input interface, and then blends the drawn OSD menu on the input image by the video processor 100.

The above display control system includes the above video processor, such that multiple functions, such as video receiving, video pre-processing, video image quality processing, video post-processing, video outputting, and the like are integrated in a system. Compared with a decentralized system, connection and data interaction between processing cores in the integrated video processor are reduced, the system stability is improved, and an effect on the system caused by an electromagnetic compatibility problem and power consumption is reduced. In addition, the video processor further includes at least one input interface that can receive the source video display data adopting the different communication protocols, process the source video display data adopting the different communication protocols to output to the external display for display, such that compatibility of the video processor is improved.

Figure 11:
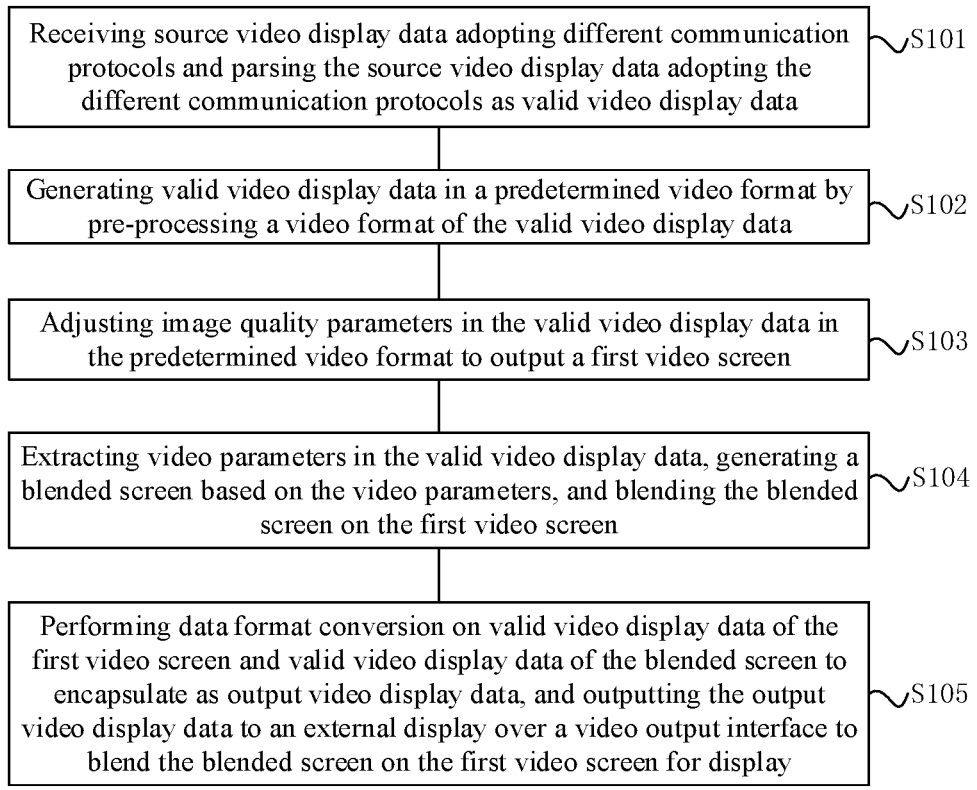
FIG. 11 is a flowchart of a method for processing a video according to some embodiments of the present disclosure.

As shown in FIG. 11, some embodiments of the present disclosure further provide a method for processing a video. On the basis of the above video processor, the method for processing the video further includes the following processes.

In S101, source video display data adopting different communication protocols IS received over at least one input interface, and the source video display data adopting the different communication protocols is parsed as valid video display data.

In S102, valid video display data in a predetermined video format is generated by pre-processing a video format of the valid video display data.

In S103, image quality parameters in the valid video display data in the predetermined video format are adjusted to output a first video screen.

In S104, video parameters in the valid video display data are extracted, a blended screen is generated based on the video parameters, and the blended screen is blended on the first video screen.

In S105, data format conversion is performed on valid video display data of the first video screen and valid video display data of the blended screen to encapsulate as output video display data, and the output video display data is output to an external display over a video output interface to blend the blended screen on the first video screen for display.

It should be noted that the description of the method for processing the video in the present disclosure can refer to the description of the operation process of the video processor in the present disclosure, which is not repeated herein in detail.

According to the method for processing the video in the embodiments of the present disclosure, the source video display data adopting the different communication protocols is parsed as the valid video display data, and the valid video display data in the predetermined video format is generated by pre-processing the video format of the valid video display data. The image quality parameters in the valid video display data in the predetermined video format are adjusted to output the first video screen, the video parameters in the valid video display data are extracted, the blended screen is generated based on the video parameters, and the blended screen is blended on the first video screen. The data format conversion is performed on the valid video display data of the first video screen and the valid video display data of the blended screen to encapsulate as the output video display data, and the output video display data is output to the external display over the video output interface to blend the blended screen on the first video screen for display. Thus, multiple functions, such as video receiving, video pre-processing, video image quality processing, video post-processing, video outputting, and the like are integrated in a system, such that connection and data interaction between processing cores are reduced, the system stability is improved, and an effect on the system caused by an electromagnetic compatibility problem and power consumption is reduced. In addition, the source video display data adopting different communication protocols is received over at least one input interface, the source video display data adopting the different communication protocols is processed over the at least one input interface to output to the external display for display, such that compatibility of the data is improved.

Furthermore, some embodiments of the present disclosure further provide a computer-readable storage medium. The computer-readable storage medium stores video processing programs. The video processing programs, when loaded and run by a processor, cause the processor to perform the above method for processing the video.

In the above computer-readable storage medium, multiple functions, such as video receiving, video pre-processing, video image quality processing, video post-processing, video outputting, and the like are integrated in a system by the above method for processing the video, such that connection and data interaction between processing cores are reduced, the system stability is improved, and an effect on the system caused by an electromagnetic compatibility problem and power consumption is reduced. In addition, the source video display data adopting different communication protocols is received over at least one input interface, the source video display data adopting the different communication protocols is processed over the at least one input interface to output to the external display for display, such that compatibility of the data is improved.

Furthermore, some embodiments of the present disclosure further provide an electronic device. The electronic device includes a memory, a processor, and video processing programs stored on the memory and runnable on the processor. The processor, when loading and running the video processing programs, is caused to perform the above method for processing the video.

In the above electronic device, multiple functions, such as video receiving, video pre-processing, video image quality processing, video post-processing, video outputting, and the like are integrated in a system by the above method for processing the video, such that connection and data interaction between processing cores are reduced, the system stability is improved, and an effect on the system caused by an electromagnetic compatibility problem and power consumption is reduced. In addition, the source video display data adopting different communication protocols is received over at least one input interface, the source video display data adopting the different communication protocols is processed over the at least one input interface to output to the external display for display, such that compatibility of the data is improved.

It should be noted that logics and/or processes shown in the flowchart or described in other manners herein, for example, sequence lists of runnable instructions considered to be used to implement logical functions are implementable in any computer-readable medium to be used by instruction running system, device, or apparatus (for example, a computer-based system, a system including a processor or other systems that can acquire and run instructions from the instruction running system, device, or apparatus) or to be used in conjunction with the instruction running system, device, or apparatus. In the specification, the term "computer-readable medium" is any device including, storing, communicating, propagating, or transmitting programs for the use of the instruction running system, device, or apparatus or the use in combination with the instruction running system, device, or apparatus. More specific embodiments of the computer-readable medium (non-exhaustive illustration) includes: an electronic connection portion (an electronic apparatus) including one or more wires, a portable computer cartridge (a magnetic device), a random access memory (RAM), a read-only memory (ROM), an erasable programmable read-only memory (EPROM or a flash memory), an optical fiber device, and a portable compact disk read-only memory (CDROM). In addition, the computer-readable medium may be paper or other suitable medium printable programs thereon. Optical scan is performed through the paper or other medium, and the programs are acquired in an electronic manner by programming, interpreting, or processing in other suitable manner when necessary and are stored in the computer memory.

It should be understood that each portion of the present disclosure may be implemented by hardware, software, firmware, or combinations thereof. In the above embodiments, multiple processes or methods may be implemented by software or firmware stored in the memory and run by a suitable instruction running system. For example, in the case of being implemented by the hardware, similarly to another embodiment, any of the following common knowledge in the field or combinations thereof may be used: a discrete logic circuit with logic gates used to implement logic functions of data signals, an application-specific integrated circuit (ASIC) with suitable combinational logic gates, a programmable gate array (PGA), a field programmable gate arrays (FPGA), and the like.

In the descriptions of the present specification, the descriptions about reference terms such as "an embodiment," "some embodiment," "examples," "specific examples," and "some examples" mean that the specific features, structures, materials or characteristics described in combination with the embodiments are included in at least one embodiment or example of the present disclosure. In the present specification, the schematic descriptions of the above terms do not necessarily refer to a same embodiment or example. Furthermore, the specific features, structures, materials or characteristics as described can be combined with any one or more embodiments or examples in a proper manner.

In addition, the terms "first," "second," and the like are only used for the purpose of description and should not be construed as indicating or implying relative importance or implicitly indicating the number of technical features as indicated. Thus, the feature defined by the term "first" and "second" explicitly or implicitly include at least one feature. Unless otherwise clearly defined, the term "a plurality of" refers to at least two, for example, two, three, and the like.

In the present disclosure, unless otherwise definitely specified and limited, the terms "disposing," "connecting," "connected," "fixing," and the like should be understood broadly, for example, fixed connection, detachable connection, or integrated; mechanical connection, or electrical connection; direct connection, indirect connection through an intermediation, connection of inner of two elements or interaction relationship of two elements, unless otherwise definitely specified. Those skilled in the art may understand specific meanings of the above terms in the present disclosure according to specific cases.

Although the embodiments of the present disclosure have been shown and described above, it can be understood that the above embodiments are exemplary and should not be construed as limiting the present disclosure. A person of ordinary skill in the art can acquire changes, modifications, substitutions and variations to the above embodiments within the scope of the present disclosure.

The invention claimed is:

1. A video processor, comprising:
   a receiving module, configured to receive source video display data adopting different communication protocols over at least one input interface and parse the source video display data adopting the different communication protocols as valid video display data;
   a pre-processing module, connected to the receiving module, and configured to generate valid video display data in a predetermined video format by pre-processing a video format of the valid video display data;
   an image quality processing module, connected to the pre-processing module, and configured to adjust image quality parameters in the valid video display data in the predetermined video format to output a first video screen;
   a post-processing module, connected to the pre-processing module and the image quality processing module, and configured to extract video parameters in the valid video display data, generate a blended screen based on the video parameters, and blend the blended screen on the first video screen; and
   a video output module, connected to the post-processing module, and configured to perform data format conversion on valid video display data of the first video screen and valid video display data of the blended screen to encapsulate as output video display data, and output the output video display data to an external display over a video output interface to blend the blended screen on the first video screen for display.

2. The video processor according to claim 1, wherein the input interface comprises:
   a first input interface module, configured to receive source video display data adopting an 12G-serial digital interface (SDI) communication protocol, a 6G-SDI communication protocol, a 3G-SDI communication protocol, or a high definition-serial digital interface (HD-SDI) communication protocol;
   a second input interface, configured to receive source video display data adopting a high definition multimedia interface (HDMI) 2.0 communication protocol;
   a third input interface, configured to receive source video display data adopting a display port (DP) 1.2 communication protocol; and
   a fourth input interface, configured to receive source video display data of an on-screen display (OSD) menu screen.

3. The video processor according to claim 1, wherein the image quality parameters comprise hue, chromaticity, contrast, brightness, color temperature, gamut, a gamma correction parameter, and a color space conversion parameter.

4. The video processor according to claim 1, further comprising: an audio transmitting module and an audio processing module, wherein the audio transmitting module is configured to receive audio data over the input interface, parse the audio data as valid audio data in a predetermined data format, and transmit to the audio processing module, such that the audio processing module processes the valid audio data and outputs to an external playback module.

5. The video processor according to claim 1, wherein the input interface further comprises an external controller interface, wherein the external controller interface is configured to be connected to an external controller, such that the external controller upgrades a system of the video processor and monitors the video processor over the external controller interface.

6. The video processor according to claim 2, wherein the receiving module comprises:
- a first receiving unit, connected to the first input interface module, and configured to parse the source video display data adopting the 12G-SDI communication protocol, the 6G-SDI communication protocol, the 3G-SDI communication protocol, or the HD-SDI communication protocol as first valid video display data;
- a second receiving unit, connected to the second input interface, and configured to parse the source video display data adopting the HDMI 2.0 communication protocol as second valid video display data;
- a third receiving unit, connected to the third input interface, and configured to parse the source video display data adopting the DP 1.2 communication protocol as third valid video display data; and
- a fourth receiving unit, connected to the fourth input interface, and configured to parse the source video display data of the OSD menu screen as fourth valid video display data;
- wherein data formats of the first valid video display data, the second valid video display data, the third valid video display data, and the fourth valid video display data are the same.

7. The video processor according to claim 2, wherein the pre-processing module comprises a synchronization unit and a first cache controller, wherein the synchronization unit is configured to synchronize valid video display data from the different input interfaces by storing the valid video display data from different input interfaces to an external cache for the first cache controller to read the valid video display data from the different input interfaces from the external cache based on a synchronization clock.

8. The video processor according to claim 6, wherein
the first input interface module comprises at least one set of SDI input interfaces, wherein each of the at least one set of SDI input interfaces comprises four SDI input interfaces configured to receive four different channels of source video display data;
the first receiving unit comprises at least one receiving sub-unit connected to the at least one set of SDI input interfaces, wherein each of the at least one receiving sub-unit is configured to convert the four different channels of source video display data to four different channels of valid video display data; and
the pre-processing module further comprises a quad display connector, wherein the quad display connector is connected to the receiving sub-unit, and is configured to convert the four different channels of valid video display data received by the receiving sub-unit to valid video display data in a predetermined video format, and perform image pasting on four channels of valid video display data in the predetermined video format based on a predetermined rule.

9. The video processor according to claim 7, wherein the pre-processing module further comprises a definition converting unit, configured to perform definition conversion on the synchronized valid video display data, such that a definition of the synchronized valid video display data reaches a target definition.

10. The video processor according to claim 9, wherein the definition converting unit performs the definition conversion on the synchronized valid video display data in a definition multiplication conversion manner, wherein pixel supplementation is performed in a case that a definition of the multiplication converted valid video display data is less than the target definition, such that a definition of a display screen reaches the target definition.

11. The video processor according to claim 9, wherein the pre-processing module further comprises a scan mode converting unit, configured to determine an input scan mode of the valid video display data, and uniformly convert the scan mode of the valid video display data to a progressive scan based on a result of the determination.

12. The video processor according to claim 11, wherein in the case that the scan mode of the valid video display data is an interlaced scan:
- valid video display data corresponding to odd rows of an odd frame and valid video display data corresponding to even rows of an adjacent even frame are interspersed and combined, such that the interlaced scan is converted to the progressive scan; or
- the valid video display data corresponding to the odd rows of the odd frame is kept unchanged, black pixels are supplemented in even rows of the odd frame, the valid video display data corresponding to the even rows of the adjacent even frame is kept unchanged, and black pixels are supplemented in odd rows of the even frame, such that the interlaced scan is converted to the progressive scan.

13. The video processor according to claim 11, wherein in the case that the scan mode of the valid video display data is a progressive segmented scan, valid video display data corresponding to odd rows of an odd field and valid video display data corresponding to even rows of an even field are interspersed and combined, such that the progressive segmented scan is converted to the progressive scan.

14. The video processor according to claim 11, wherein the pre-processing module further comprises a frame rate converting unit, wherein the frame rate converting unit is configured to uniformly copy frame rates of the valid video display data in integer multiplication to uniformly convert to a target frame rate.

15. The video processor according to claim 14, wherein the post-processing module further comprises a second cache controller, configured to read and write the external cache in the case that the post-processing module caches the valid video display data.

16. The video processor according to claim 8, wherein the post-processing module comprises an OSD menu blending unit, a state information generating unit, an oscillogram blending unit, a mark generating unit, and a video analyzing unit; wherein
the OSD menu blending unit is configured to form an OSD menu based on OSD menu parameters received from a low-voltage differential signaling (LVDS) receiving unit and blend the OSD menu on the first video screen;

the state information generating unit is configured to identify the video format of the valid video display data and generate a blanking screen based on the video format of the valid video display data, such that the blanking screen is blended on the first video screen experiencing image quality processing;

the video analyzing unit is connected to the oscillogram blending unit, and is configured to read the valid video display data from the pre-processing module and extract oscillogram information of the valid video display data;

the oscillogram blending unit is configured to draw an oscillogram based on the oscillogram information, such that the oscillogram is blended on the first video screen; and the mark generating unit is configured to acquire mark information and generate a mark graph based on the mark information, such that the mark graph is blended on the first video screen.

17. A display control system, comprising a video processor, wherein the display control system further comprises a controller configured to control the video processor to process received source video display data and transmit the processed video display data to a display; and the video processor comprises:

a receiving module, configured to receive source video display data adopting different communication protocols over at least one input interface and parse the source video display data adopting the different communication protocols as valid video display data;

a pre-processing module, connected to the receiving module, and configured to generate valid video display data in a predetermined video format by pre-processing a video format of the valid video display data;

an image quality processing module, connected to the pre-processing module, and configured to adjust image quality parameters in the valid video display data in the predetermined video format to output a first video screen;

a post-processing module, connected to the pre-processing module and the image quality processing module, and configured to extract video parameters in the valid video display data, generate a blended screen based on the video parameters, and blend the blended screen on the first video screen; and a video output module, connected to the post-processing module, and configured to perform data format conversion on valid video display data of the first video screen and valid video display data of the blended screen to encapsulate as output video display data, and output the output video display data to an external display over a video output interface to blend the blended screen on the first video screen for display.

18. A method for processing a video, comprising:

receiving source video display data adopting different communication protocols over at least one input interface and parsing the source video display data adopting the different communication protocols as valid video display data;

generating valid video display data in a predetermined video format by pre-processing a video format of the valid video display data;

adjusting image quality parameters in the valid video display data in the predetermined video format to output a first video screen;

extracting video parameters in the valid video display data, generating a blended screen based on the video parameters, and blending the blended screen on the first video screen; and performing data format conversion on valid video display data of the first video screen and valid video display data of the blended screen to encapsulate as output video display data, and outputting the output video display data to an external display over a video output interface to blend the blended screen on the first video screen for display.

19. A computer-readable storage medium, storing one or more video processing programs, wherein the one or more video processing programs, when loaded and run by a processor, cause the processor to perform the method for processing the video as defined in claim 18.

20. An electronic device, comprising a memory, a processor, and one or more video processing programs that are stored on the memory and runnable on the processor, wherein the processor, when loading and running the one or more video processing programs, is caused to perform the method for processing the video as defined in claim 18.

* * * * *